United States Patent [19]

Kentor

[11] 4,279,935

[45] Jul. 21, 1981

[54] DRY SAUSAGE PROCESSING WITH ADDED ACID

[75] Inventor: William E. Kentor, Highland Park, Ill.

[73] Assignee: Servbest Foods, Inc., Highland Park, Ill.

[21] Appl. No.: 23,040

[22] Filed: Mar. 23, 1979

[51] Int. Cl.$^3$ .............................................. A23B 4/12
[52] U.S. Cl. ...................... 426/264; 426/266; 426/332; 426/532; 426/646
[58] Field of Search .............. 426/332, 335, 646, 652, 426/532, 520, 506, 456, 455, 465, 105, 135, 138, 264, 266

[56] References Cited

U.S. PATENT DOCUMENTS

| | | | |
|---|---|---|---|
| 2,346,232 | 4/1944 | Pivet et al. | 426/332 |
| 2,383,907 | 8/1945 | Beechem et al. | 426/332 |
| 2,681,287 | 6/1954 | Starr | 426/652 |
| 2,992,115 | 7/1961 | Sair et al. | 426/646 |
| 3,122,442 | 2/1964 | Sair | 426/641 |
| 3,170,797 | 2/1965 | Sloan et al. | 426/646 |
| 3,380,833 | 4/1968 | Turner | 426/646 |
| 3,482,996 | 12/1969 | Christianson et al. | 426/646 |
| 3,664,850 | 5/1972 | Kentor | 426/332 |

OTHER PUBLICATIONS

Komarik et al., "Sausages", Food Products Formulary, vol. 1, pp. 33–51, 1974.

Primary Examiner—Joseph M. Golian
Assistant Examiner—George C. Yeung
Attorney, Agent, or Firm—Hill, Van Santen, Steadman, Chiara & Simpson

[57] ABSTRACT

An extremely rapid, economical and safe method of producing dry sausages comprising adding natural bactericides and bacteriostats to comminuted meats in an amount sufficient to at least inhibit growth of the generally encountered pathogenic and non-pathogenic organisms in such meats, admixing a given amount of at least one acidulating material to such meats and forming sausages from such acidulated meats so that a pH of less than about 5.7 is attained within said sausages, thermally treating the sausages under time-temperature conditions sufficient to attain an average internal temperature within each sausage of at least about 58° C. and subjecting the thermally-treated sausages to a controlled drying environment having relatively high temperatures and relatively low relative humidity for a period of time sufficient to reduce the moisture level in each of such sausages to a maximum of approximately 35%. Stable, safe sausage products are attained within about 5 to 20 days after initiation of the process.

11 Claims, No Drawings

DRY SAUSAGE PROCESSING WITH ADDED ACID

BACKGROUND OF THE INVENTION

1. Field of the Invention

The invention relates generally to preservation of meats under ambient consumer conditions and somewhat more particularly to a process of producing dry sausages as well as the resultant sausage products.

2. Prior Art

Sausages of various types are well known in the art from antiquity. In the earliest recorded histories of civilization, references are found to production of various sausages. "Sausage" apparently is derived from the Latin term "salsur", a term designating a common method of preserving foods, particularly meats by salting. Sausage makers empirically determined that certain admixtures of spices, salts and meats, when subjected to certain procedures, produced a sausage that did not spoil when stored in ambient or warm environment. Treatment of a meat mass by the addition of salt, nitrates and nitrites as well as by smoking the so-treated meat mass in dense smoke resulted in varying degrees of product safety and stability.

As described by Kramlich, Pearson and Tauber in PROCESSED MEATS, "Dry Sausage", page 136 (Avi Publishing Co., 1973):

"semidry sausages are smoked and cooked to varying degrees, whereas dry sausages are not cooked and only with some products is smoke applied. The manufacture of dry sausage is more difficult to control than that of semidry or more conventional type sausages. Overall processing time may require 90 days. As a result of this prolonged holding, the sausage is vulnerable to chemical and microbiological degradation. However, when prepared properly, the finished sausages are usually stable and can be held with little or no refrigeration. The salt, acid and moisture content, as well as the specific types of organisms associated with the product, make for the characteristic flavor and texture of dry sausages. The raw materials and the sequence of events must be carefully controlled. Dry sausages are the 'ne plus ultra' of the industry and the dry sausage maker is truly an artist."

In relatively recent times, sausage makers discovered that refrigerated storage of a meat mass in containers which permit substantial exposure to air (such as pans, trays, etc.) allowed fermentation of the meats mass by growth of acid-producing bacteria, primarily lactobacilli. Such bacteria growth produced lactic acid in the meat mass, which is beneficial because it inhibits the growth of certain pathogenic bacteria. Such inhibitory action appears to be primarily due to the rapid consumption by the lactobacilli bacteria of the glucoses naturally present in meats, thereby denying a readily-available food supply to other bacteria. Additionally, the acid produced by the lactobacilli yields an environment which inhibits or prevents growth of certain other bacteria which are also indigenous to meats and may be highly toxic to man and certain animal species by the production of toxins (particularly the toxin of clostridium botulinum). Subsequent to this fermentation of a meat mass (which typically takes 2 to 4 days), and forming stuffed sausages therefrom (which may be suspended in a smoke house, depending on the preference of the customer or consumer), the sausages were dried by hanging in a relatively cool, ventilated room for long periods of time until a substantial portion of the moisture in the meat mass migrated from the interior of such sausage to the surface of the casing and evaporated by circulating air currents. This process required a relatively long time period (up to about 120 days) to yield a useful product and to insure slow, even drying and shrinkage. Attempts to dry such sausages more rapidly typically resulted in the formation of a "skin" of dried meat on the outer portions of the sausages which entrapped the moisture in the center or interior of the sausages, thereby permitting bacterial and enzymatic spoilage to occur within such sausages. Disadvantages of currently known methods of producing dry sausage include one or more of the following aspects:

1. Traditional dry sausage production processes provide significant risk of deterioration of the sausage product by bacterial or enzymatic activity during the long processing and drying periods required.

2. Traditional dry sausage production processes involve high labor costs due to the numerous times that the meat mass must be handled prior to placement in a drying room.

3. Traditional dry sausage production processes include a hazard of unpredictable loss by spoilage of the finished sausage product due to the growth of undesirable organisms.

4. Traditional dry sausage production processes frequently cause the development of undesirable flavors in the meat mass due to excessive production of lactic acid by lactobacilli bacteria that are indigenous to fresh meats which are fermented during the time periods and in the temperature ranges prescribed in the prior art (storage for 2 to 10 days at about 4° C. to 7° C.).

5. Traditional dry sausage production techniques frequently cause the development of undesirable flavors in the meat mass induced by the addition of a bacteria culture to such meat mass prior to stuffing the meat mass into natural or artificial casings.

6. Traditional dry sausage processing techniques require large investments of capital in order to build drying rooms of sufficient size to store sausage products for the presently required drying time periods (up to 120 days).

7. Traditional dry sausage production techniques require a large commitment of capital in order to finance inventories of sausage products during the total processing and drying periods typically required.

Sair U.S. Pat. No. 2,992,116 suggests that the bright red color and permanence thereof in fresh or cured meat emulsions may be improved without adverse effects on the water-binding capacity and the emulsifying qualities of meat proteins by adding relatively small, precise amounts of glucono delta lactone to meats as they are undergoing emulsification. However this publication does not relate to dry sausage production.

In addition, certain prior art publications, such as Marchand U.S. Pat. No. 1,167,193; Gooding U.S. Pat. No. 2,379,294; Coleman et al U.S. Pat. No. 2,474,228; Douglass et al U.S. Pat. No. 2,901,354 and others suggest adding various chemical acidulants to meat masses for various purposes, including producing hostile environments for common pathogens. However, such prior art processes are generally unsatisfactory because the wide variation in raw material acid content, unanticipated contaminations of raw materials and equipment, as well as improper hygiene of workers, all contribute to product failure, and are unsatisfactory for commercially reliable sausage-making processes. Further, certain prior art publications, such as Nickerson et al U.S. Pat. No. 3,899,594, suggest incorporating a select bacteria culture along with certain acidulants into various food stuffs to prolong the storage life thereof. However, such processes yield undependable results because bacteria conditions in raw materials, equipment and workers is not sufficiently known (or controlled) in commercial processes.

In my prior U.S. Pat. No. 3,664,850 I describe and claim a novel method for fast drying of meat masses in casings. Generally, such process comprises applying positive liquid-expressing pressure to casing-bound meats so as to force moisture therefrom and rapidly removing the so-expressed moisture by relatively high temperatures and low relative humidity conditions. However, that process is materially distinct from the present invention.

In addition, Piret et al U.S. Pat. No. 2,346,232 and Christianson et al U.S. Pat. No. 3,482,996 suggest other processes for relatively quickly dehydrating meat masses, either by spreading a comminuted meat mass in a thin layer and forcing high velocity relatively dry air across such meat mass to dry such meats or by admixing dehydrated protein fibers with the meat mass to attain a lower average moisture content within the resultant mixture. However, neither of these processes are suitable for dry sausage production.

Some of the most significant deficiencies of the earlier-described traditional methods of producing dry sausages generally comprise (1) the "art" aspect of the overall process, which makes mass production and standardization of product difficult; (2) the considerable risk of product spoilage throughout the prolonged manufacturing process; (3) the significant danger of economic loss by recall of a product lot, if determined to contain various pathogens; (4) the high costs of facilities and inventories necessary to maintain a viable commercial enterprise; and (5) the frequently encountered undesirable molds on sausages in the drying room, induced by relatively low temperatures, high humidity and extended drying time periods typically required.

SUMMARY OF THE INVENTION

The invention provides a dry sausage and method of producing the same which eliminates or significantly reduces the above deficiencies of the prior art processes and significantly reduces the risks and high costs associated with heretofore available dry sausage technology.

An object of the invention is to provide a product and process for preparing a dry sausage in a substantially shorter time period than with heretofore available methods.

Another object of the invention is to dry an unfinished dry sausage in a substantially shorter time period than possible with traditional methods.

It is another object of the invention to improve the safety and stability characteristics of finished dry sausage (ability to store under non-refrigerated conditions without significant bacterial growth or organoleptic degradation) in an economical manner.

It is yet another object of the invention to destroy, inactivate and/or inhibit the growth of certain bacterial and viral pathogens which are hazardous to humans or animals, and viral pathogens which are hazardous to humans or animals, and which may be present in raw meats, extenders and many spices used in the manufacture of sausages.

It is another object of the invention to provide an uninterrupted sequence of processing steps yielding stable, safe and economic dry sausage products.

These and further objects of the invention are attained by a novel combination of process steps, some of which are optional and/or can be used separately, while others are essential and must be used in combination. A determination of which process steps are to be used and which are optional depend upon many factors, including the species of meat which are used, singly or in combination; on bacteriological and viral contaminations to which the live animals may have been exposed prior to slaughter; on the particular manufacturing facilities which are available to the sausage maker; on the equipment which is available to the sausage maker; and on customer organoleptic preferences.

In accordance with the principles of the invention, dry sausages are produced by adding a quantity of natural bactericides and bacteriostats to comminuted meats in amounts sufficient to at least inhibit growth of generally encountered pathogenic and non-pathogenic organisms in such meats, admixing a select amount of at least one acidulating material to such meats and relatively promptly (i.e., within about 3 hours after all acidulants are added) forming sausages from such acidulated meats so that a pH of less than about 5.7 is attained within such sausages, thermally treating the so-formed sausages under time-temperature conditions sufficient to attain an average internal temperature within each sausage of at least about 58° C., and subjecting the thermally treated sausage to a controlled drying environment having a relatively high temperature and a relatively low relative humidity for a period of time sufficient to reduce the moisture level in each of the sausages to a maximum of approximately 35%.

In preferred embodiments of the invention, the natural or food-grade bactericides and bacteriostats are selected from a group consisting of potassium nitrite, sodium nitrite, and mixtures thereof and are preferably added to a given mass of comminuted meats in an amount equivalent to at least about 150 ppm and generally in the range of about 100 to 150 ppm. In certain preferred embodiments of the invention, the acidulating materials are selected from the group consisting of glucono delta lactone, lactic acid, acetic acid, phosphoric acid, maleic acid, citric acid, fumaric acid, tartaric acid, adipic acid, succinic acid, hydrochloric acid, anhydrides of such acids, edible salts of such acids and mixtures thereof. Preferred acidulating materials from this group comprise glucono delta lactone, lactic acid, acetic acid, hydrochloric acid, and mixtures thereof. In other preferred embodiments of the invention the acidulating materials are selected from the so-called "G.R.A.S." list, which is a list of good additive materials "generally recognized as safe", and is set forth in Title 21, Food and Drugs, of the United States Code. In certain preferred embodiments of the invention, the thermal treatment of prepared sausages includes a time period of about 5 to 12 hours and a temperature in the range of about 37° to 83° C. In certain embodiments of the invention, the sausages, after thermal treatment, may be subjected to a relatively brief hot water shower, with a water temperature of about 83° C.

In preferred embodiments of the invention, the process of producing dry sausages is relatively continuous and yields within about 5 to 20 days a dry sausage product capable of prolonged, safe, room-temperature storage. Further, in preferred embodiments of the invention, the dry sausage produced in accordance with the invention is characterized by a pH of about 5.7 to 5.0, a moisture content of approximately 35%, a salt content of at least about 5%, a nitrite content of not more than about 50 ppm and a water activity level of not more than about 0.86.

Other and further objects, aims, purposes, advantages and the like of the present invention will be readily apparent to those skilled in the art from the following description of preferred embodiments thereof, although variations and modifications may be effected without departing from the spirit and scope of the novel concepts of the invention.

DESCRIPTION OF PREFERRED EMBODIMENTS

The invention provides a dry sausage product and method of producing the same whereby relatively rapid processing times and process steps provide a safe (U.S.-D.A. approved) dry sausage product which is characterized by: a relatively firm composition that resists finger indentation; a relatively smooth "cutability" at ambient room temperatures; safeness for non-refrigerated distribution, sale and consumption; a pH of about 5.7 to 5.0; a moisture content of approximately 35%; a nitrite content of not more than about 50 ppm; and a water activity level of not more than about 0.86.

In accordance with the principles of the invention, such dry sausage product is produced by adding, along with a select mixture of condiments, natural bactericides and bacteriostats to select meats relatively quickly after grinding so as to substantially prevent or at least inhibit growth of the most generally encountered pathogenic and non-pathogenic organisms, particularly Pseudomons. Thereafter, select amounts of certain acidulating materials, such as food-grade organic acids and/or food-grade inorganic acids, are admixed relatively quickly to the meat mass and select size sausages are formed therefrom in a more or less conventional manner by stuffing such meat mass into natural or synthetic casings so that a pH of less than about 5.7 is attained within such sausages. The addition of such acidulating materials inactivates certain dangerous viruses, particularly the Foot and Mouth disease viruses and Hog Cholera viruses (these viruses appear to be inactivated by the low pH alone or by a combination of the low pH and subsequent thermal treatment). The so-formed sausages are then subjected to a thermal treatment under time-temperature conditions in a relatively conventional heating chamber or smokehouse so as to attain an average internal temperature within each sausage of at least about 58° C. within about 5 to 12 hours after initial meat grinding and formulation (the temperature reached within the sausages and the period of time for such thermal treatment are dictated by the species of meats present in the sausages). The thermally treated sausages are then subjected to a controlled drying environment having a relatively high temperature (dry bulb) and relatively low relative humidity conditions (in comparison to typical sausage drying environments) for a period of time sufficient to reduce the moisture level in the sausages to an average maximum of approximately 35%. This drying environment removes moisture relatively rapidly at an average rate of about 2% per day, and is successfully performed because the meats in the sausage have been previously cooked to an extent sufficient to denature the proteins thereof, with the accompanying release of water, which is, of course rapidly removed during the drying process. Further, any risk of bacterial growth in such a hot and dry environment is substantially eliminated or at least materially reduced.

In the formation of dry sausages in accordance with the principles of the invention, all meats suitable for human consumption may be utilized. Various grades or types of beef, veal, pork, mutton, lamb, rabbit, poultry (including chicken, turkey, ducks, gesse, pigeon, etc.,) whether mechanically deboned or otherwise, singly or in any desired combination, may be comminuted to produce a given meat mass. Further, various extenders, such as cereals and by-products thereof, milk and by-products thereof, protein hydrolysates and other food-grade additives may be admixed with select meats. In addition, various condiments and the like may also be admixed as desired to satisfy particular organoleptic criteria.

By practicing the principles of the invention, one is able to eliminate or substantially reduce the "art" aspect of traditional dry sausage processes and substitute therefor scientific methods and procedures which are easily taught to substantially non-skilled meat workers. In a relatively short time period, untrained personnel can be instructed to safely and consistently produce and laboratory test dry sausages and dry salami by the process of the invention.

In the practice of the invention, natural or food-grade bactericides, bacteriostats and mixtures thereof are admixed into a select meat mass in relatively high amounts so as to at least inhibit growth of generally encountered pathogenic and non-pathogenic organisms. Preferably, such bactericides and bacteriostats are selected from the group consisting of potassium nitrite, sodium nitrite and mixtures thereof, although sodium or potassium nitrate or mixture thereof may also be utilized. Preferably such bactericides and bacteriostats are added in an amount in the range of about 100 to 150 ppm of meat mass. During the thermal treatment and the drying stage, the level of such bactericides and bacteriostats is substantially reduced so that the finished sausage products of the invention generally contain less than about 50 ppm of nitrite therein.

Also in the practice of the invention chemical, acidulating materials, preferably food-grade organic acids and food-grade inorganic acids, are admixed into a select meat mass in select amounts calculated to yield a pH of less than about 5.7 in the resultant meat mass. Preferably, such acidulating materials are selected from the group consisting of glucono delta lactone, lactic acid, acetic acid, phosphoric acid, maleic acid, citric acid, fumaric acid, tartaric acid, adipic acid, succinic acid, hydrochloric acid, anhydrides of such acids, edible salts of such acids and mixtures thereof. Preferred acidulating materials within this group comprise glucono delta lactone, lactic acid, acetic acid, hydrochloric acid, and mixtures thereof. In addition, such acidulating materials may be selected from the various acidulating materials found on the so-called G.R.A.S. list set forth in Title 21, Food and Drugs, United States Code, which is incorporated herein by references.

In practicing the principles of the invention, variation in meats or meat combinations are not material to the invention. Combinations of meat, fat and meat by-products, as well as various extenders, are well known in the sausage art. Similarly, variations in condiment mixtures, at least to a certain extent, are immaterial to the practice of the invention. Of course, proper additions of bactericides, bacteriostats and acidulating materials are required for a proper practice of the invention.

It should be noted that the addition of a chemical acidulating material (such as glucono delta lactone or acetic acid in the form of vinegar) as opposed to bacterial acidulating material is required to attain a pH in a stuffed meat mass ranging from about 5.7 or 5.4 or even lower. Relatively strongly disassociating acids, such as food-grade HCl, alone, do not appear capable of producing the complex set of interacting reactions and characteristics typically required to produce an acceptable dry sausage product in accordance with the principles of the invention. Numerous trials with bovine and swine meat sausage formulations have demonstrated that organoleptically acceptable levels of relatively strongly disassociating food-grade acids are typically incapable of producing a satisfactory finished product. This is presently believed to be due to the fact that such relatively strongly disassociating acids quickly disassociate into their respective ions and cause meat proteins to go below their isoelectric point, thereby materially reducing their ability to adhere to one another (i.e., form a sausage). On the other hand, with relatively weak or slowly acting food-grade acidulating materials, such as glucono delta lactone, which only slowly disassociated, no such problem is encountered and entire molecules thereof may penetrate meat cell walls to function therein. Further, such relatively weak acidulating materials almost never lower the pH of proteins below their respective isoelectric points during the short time period utilized to mix and stuff the meat mass into casings. Thus, in accordance with the principles of the invention, when the select acidulating materials include a relatively strongly disassociating acid, which may be selected for subjective or for economical reasons, care must be exercised to insure that only relatively small and precise amounts thereof are added and, preferably, a relatively strongly disassociating acid is admixed with one or more relatively weakly disassociating acidulating materials so as to insure that the protein isoelectric point is not reached before the sausage is formed.

In order to further illustrate the substantial differences in techniques and time requirements between traditional dry sausage process and those of the invention, the following typical sequence of events is set forth.

In the traditional process, during the first day (typically a 24 hour day) an operator grinds or comminutes select meats, adds select spices thereto, including an amount of sodium or potassium nitrite or nitrate not to exceed about 90 ppm and then prepares the resultant meat mass for fermentation or "curing". Such fermentation occurs over the next two to four days and typically involves storing the meat mass in open containers in a cooler (3° to 7° C.) and allowing natural fermentation to occur. Alternatively, a starter culture of select bacteria may be added to the meat mass, which is then stored one or more days in containers or in casings in a cooler. As yet another alternative, the meat mass, with or without a starter culture of bacteria, may be stuffed into the casings and hung in a fermentation environment having a relative humidity of 60% to 90% and a temperature of 3° C. or higher for one or more days. After such fermentation and typically during the fifth day after the production of the meat mass, the fermented meat mass is stuffed into casings and placed in a drying room or, if previously stuffed, merely placed in a drying room. These sausages are than maintained in the drying room for up to 120 days before a finished product is attained.

In contrast, with the inventive process, during the first day (typically a 24 hour day) a work force (i.e., one or more operators) grinds select meat, adds select spices, bactericides and bacteriostats, such as sodium or potassium nitrite, in an amount equivalent to about 150 ppm of meat and adds a select amount of at least one acidulating material to the meats and admixes these materials to attain a resultant meat mass. The resultant meat mass is, during the first day, stuffed into select casings and, still during the first day, thermally treated or cooked in a suitable chamber or smokehouse to which smoke may be added, if desired, for a taste. Still during the first day, the thermally treated or cooked sausages may be showered with hot water and placed in a drying room. These sausages are then maintained in the drying room for 5 to 20 days to attain a completely finished product suitable for non-refrigerated storage, sale or consumption.

Further, certain bacterial, viral and physical differences exist between the traditional process and that of the invention. The process of the invention insures against undesirable bacterial and most commonly encountered viral threats against man or animal species, that can and do occur with the traditional process.

In the traditional process, during the fermentation period thereof, psychrophilic (cold-loving) bacterial growth conditions exist. Pathogenic bacteria (particularly *S. aureus* and *C. botulinum*) may remain viable throughout this phase and become active when temperatures later rise to mesophilic (intermediate temperature-loving) bacterial growth inducing levels (as during drying). In the traditional process fermentation is achieved by acid-forming bacteria which may fail to inactivate certain commonly encountered viruses and/or bacteria. Further, during the entire traditional process, enzyme activity continues. Naturally occurring enzymes in red meats may continue to function and degrade sausage flavor and color characteristics.

In contrast, with the process of the invention, no fermentation is required or occurs. The commonly encountered pathogenic and non-pathogenic organisms are destroyed or at least inactivated by the relatively high levels of nitrites and salts. Psychrophilic and/or mesophilic bacteria that may remain are destroyed by the thermal treatment. Pathogenic viruses are at least inactivated by the lowering of the pH of the meat mass to 5.7 or lower plus thermal treatment of such meat mass to about 58° C. or higher, depending upon the species of meat utilized and any known viral risks. Further, with the process of the invention, certain enzymes are inactivated at the cooking or thermal treatment temperatures so that flavor and color characteristics remain relatively constant throughout acceptable time requirements for unrefrigerated storage, sale and consumption. Yet further, by adhering to the principles of the invention, particularly in regard to adding relatively high amounts of bactericides, bacteriostats and acidulating materials to the meat mass and subjecting such stuffed meat mass to the thermal treatment, a broad range of viral pathogens is inactivated (which are indigenous in certain areas of the world and are identified as causing "exotic" diseases to certain animals species in other areas of the world).

Yet further, certain chemicals and physical differences exist between the traditional processes and the process of the invention.

In the traditional process, fermentation of the meat mass (whether in sausage form or not) is achieved by encouraging growth of naturally-occurring flora or by adding a starter culture of certain preferred strains of bacteria. This necessitates a restricted level of bactericides and bacteriostats that can be utilized, since it is necessary to permit the growth of the desired bacteria. Of course, such low levels of bactericides and bacteriostats (typically 50 to 75 ppm) can permit the growth of undesired organisms as well. Further, the traditional process requires storing the meat mass or the stuffed sausages in an environment that encourages growth of acid-forming bacteria as well as other bacteria and encourages the non-arrest of certain viruses. In the traditional process, cooking and/or thermal treatment of unfinished product is avoided. Further, in the traditional process, sausages are slowly dried in rooms having approximately 65% relatively humidity and a temperature of about 11° or 12° C. for prolonged periods of time until the weight of such sausages is reduced by about 25% to 30%, which conditions encourage bacterial growth within and about the so-treated sausages.

In contrast, with the process of the invention, no fermentation and no significant bacterial growth takes place. Further, the process of the invention requires additions of relatively high amounts of bactericides, bacteriostats, and acidulating materials, to an extent permitted by the U.S. Department of Agriculture, sufficient to destroy or inactivate certain bacteria. The process of the invention eliminates storage of the meat mass since bacterial growth is not desired. Also, the heat or thermal treatment of the sausages to a cooked stage (i.e., 58° to about 71° C.) destroys or inactivates remaining pathogenic bacteria and certain viruses. This thermal treatment also reduces the weight of the sausages by about 10 to 15%. Further, the relatively rapid drying of the thermally treated sausages in accordance with the principles of the invention, which includes subjecting such sausages to temperatures of about 18° to 24° C. and a relative humidity of approximately 55% or less for a period of time sufficient to reach a cumulative weight loss of about 25% to 35% (including thermal treatment loss) deactivates meat enzymes and remaining pathogenic bacteria and certain viruses, including bacteria and viruses that are indigenous in certain areas of the world but are identified as causing "exotic" diseases to certain animal species in other areas of the world.

It is important to recognize that the increased temperatures and decreased humidity utilized in drying sausages in accordance with the principles of this invention, as compared to prior art drying conditions, produces a drying environment with substantially greater drying capacity. The conditions of traditional drying produce an environment capable of removing approximately four grains of water per pound of air. In contrast, the drying conditions utilized in the practice of the invention produce an environment capable of removing approximately twenty-eight grains of water per pound of air (each environment being calculated on an identical air volume with 10 to 20 changes per hour). A unique element of the inventive process, as regards to drying environment utilized and in contrast with traditional processes, is the condition of the sausages placed in the drying room. The traditional sausage products, when placed in drying room, can have viable bacteria and/or viruses therein of a mesophilic nature which grow and multiply in an environment above 15° or 16° C. In the traditional "cold-drying" rooms these organisms are relatively dormant and must be deactivated by moisture reduction and water binding (reduced water activity). The slow achievement of such conditions within the sausages enventually inactivates these pathogens. However a considerable danger exists that some of such pathogens can survive and become active during the non-refrigerated storage, sale or consumption. In contrast, the sausage product of the invention, when placed in a drying room, contains no or substantially no viable bacteria and/or viruses therein because the combination of the bacteriostats, bactericides, acidulating materials and thermal treatment inactivates or substantially destroys any such pathogens before drying. Accordingly, the prior art upper temperature limits for dry sausages are not applicable in the practice of the invention and the finished product of the invention is substantially safer than those obtained by the traditional processes.

With the foregoing general discussion in mind, there is presented detailed examples which will illustrate to those skilled in the art the manner in which this invention is carried out. However, the examples are not to be construed as limiting the scope of the invention in any way.

In the following examples, meat and by-products are considered as 100%. Other ingredients are shown as a volume or percentage of the meat mass.

EXAMPLE I

65% beef, 20% beef tripe, 15% beef fat (flank) were attained and set aside. A condiment mixture comprised of 3.33% salt, 1.0% cane sugar, 0.4% ground white pepper, 0.2% cracked pepper, 150 ppm sodium nitrite, 0.07% garlic powder, 0.5% glucono delta lactone and 0.3% liquid smoke (such as commercially available under the trade designation Griffith Royal AA) was prepared and set aside.

The beef tripe was cooked in water until soft (water approximately 93° C.) and then chilled to about 3° C. Then the beef and beef tripe were ground through a ⅛ inch plate. The beef fat was cooled to about −4° C. and ground through a 3/16 inch plate. The ground beef and beef tripe were admixed and the pH of the resultant meat mass was determined as being 6.3. The pH of the liquid smoke (which is a complex mixture of food-grade acids) was 2.2.

The ground beef and beef tripe and all dry ingredients were placed in a Hobart paddle mixer and were admixed therein for about three minutes. The temperature of the resultant admixture was about +3° C. The ground fat was then added to this admixture and mixed for an additional three minutes. Temperature of resultant mass was about +2° C.

The ground and admixed product so attained was placed in a piston-type air stuffer (Buffalo Model 300), well tamped, and stuffed into fibrous cellulose casing (Union Carbide 1 SLDS) and clipped to lengths of about 229 mm. The diameter of such casings was approximately 43 mm. The stuffed sausages were hung on rods and placed in a smokehouse. Cooking/smoking schedule was as follows:

| Temp. of Smokehouse | Internal Temp. of Sausages | RH Smokehouse | Time |
|---|---|---|---|
| 37° C. | 4° C. | 65% | Start |
| 38° C. | to reach 15° C. | 65% | 2 hours |
| 49° C. | to reach 26° C. | 60% | 2 hours |

-continued

| Temp. of Smokehouse | Internal Temp. of Sausages | RH Smokehouse | Time |
|---|---|---|---|
| 60° C. | to reach 43° C. | 60% | 1hr. 45min. |
| 71° C. | to reach 61° C. | 60% | 1hr. 45min. |

Hardwood smoke was introduced after the first hour and maintained for the total process. After the internal temperature of the sausages reached about 61° C. and the resultant temperature was maintained for 15 minutes, the sausages were showered briefly with hot water at a temperature of approximately 82° C.

The sausages were then permitted to cool in ambient room temperature of about 26° C. for approximately 4 hours. The pH of such sausages was determined to be 5.6 with a Radiometer Meter. The shrinkage of the sausage at this cooked stage was calculated to be 12%. The sausages were then transferred to a drying room. The drying room was operated at 21° C. to 23° C. with the RH (relative humidity) varying from 52% to 62%. Humidity variations were the result of: (a) wet sausages elevating RH for the first 36 hours and (b) night-time RH was elevated because external "make-up air" had high RH (approximately 85% vs. day time RH of 60%). After 3 days, RH in the drying room was maintained between 50% and 58%. After 7 full days in the drying room, the total shrinkage calculated from stuffed weight of sausages, was 37%.

After 7 days, the sausages were removed and examined. The sausages were relatively firm and had acceptable color, texture, odor and flavor as evaluated by a taste panel of knowledgeable sausage makers. Further the sausages had a pH of 5.65, a salt level of 5.1%, an Aw (water activity) of 0.86 and a moisture content of 29%.

In subsequent examples, meat ingredients were changed, while the dry ingredients remained constant in formula and amounts as set forth in Example I (although it will be appreciated that changes can be made without departing from the spirit and scope of the invention, for example, garlic may be omitted, salt level and/or sugar level changed, smoke omitted, etc.). Grinding, mixing, stuffing, cooking, showering, and drying techniques were the same as set forth in Example I. Any time/temperature changes because of particular meat species are indicated in the subsequent examples.

EXAMPLE II

Beef 60%, beef tripe 20%, beef fat (flank) 20%.

Cooking time required to reach an average internal temperature of 61° C. in the sausages was 8.25 hours. Total shrinkage of the sausages after 7 full days in the drying room was calculated to be 36%.

EXAMPLE III

Lean pork 75%, pork fat (trimmed from pork picnics) 25%.

An increased cooking time to 11 hours was required to reach an internal sausage temperature of about 69° C. Total sausage shrinkage, after 8 full days in the drying room, was 31%.

EXAMPLE IV

Lean pork 75%, pork fat 15%, beef tripe 10%.

An increased cooking time to 10.75 hours was necessary to attain an average internal sausage temperature of about 69° C. After 9 full days in the drying room the total shrinkage of the sausages was 29%.

EXAMPLE V

Lean pork 75%, pork fat 10%, beef fat (flank) 15%.

An increased cooking time to 10.7 hours was required to reach an internal sausage temperature of about 69° C. After 9 full days in the drying room, the sausages were calculated to have undergone a total shrinkage of about 30%.

EXAMPLE VI

Beef chuck, boneless, 75%; beef fat (flank) 25%.

The prepared sausages were cooked for a total of 8 hours to attain an internal sausage temperature of about 61° C. After 6 full days in the drying room, the sausages underwent a total shrink of about 35%.

Common to all of the above Examples, meat formulation variations revealed that the initial pH of the respective meat masses ranged from about 6.2 to 6.6. After the thermal treatment or cooking, the pH of each lot of sausages ranged from about 5.6 to 5.7.

In all of the above examples, an experienced taste panel rated each lot of sausages for firmness, texture, cutability, flavor, color and odor. All of such characteristics were found to be acceptable by this panel, with the sausages of Example VI having the highest rating for color.

EXAMPLE VII

To confirm the stability of dry sausages formulated and processed in accordance with the principles of the invention, select sausages from Example I, III, V and VI were incubated at about 37° C. for 30 days and then laboratory-tested for total bacterial count. Bacteria, by count, were reported within acceptable levels.

EXAMPLE VIII

To confirm that toxins pathogenic to man and those most commonly pathogenic to certain species of animals, do not survive the process of the invention, suitable laboratory tests were conducted on randomly selected sausages from the above Examples. Negative reports, i.e., absence of toxins frequently encountered in sausages, was obtained in each instance.

The economical benefits of the process of the invention result from a decrease of total processing time of at least up to about 50%, with concurrent increased through-put in a dry sausage plant, when compared to operating such plant under the traditional process. Further, the process of the invention eliminates bacterial and viral risk, which is of great importance to consumer health and to the processors' commercial results. Inactivation of viruses of certain exotic animal diseases via the process of the invention permits the safe and rapid production of dry sausages in various countries of the world which cannot competitively produce safe dry sausages under the traditional methods.

The foregoing is considered as illustrative only of the principles of the invention. Further, since numerous modifications and changes will readily occur to those skilled in the art, it is not desired to limit the invention to the exact formulations and operations shown and described, and accordingly, all suitable modifications and equivalence thereof may be resorted to, falling within the scope of the invention as claimed.

I claim as my invention:

1. A method of producing dry sausage comprising a combination of sequential substantially uninterrupted steps of:
   (a) adding a quantity of food-grade bactericides and bacteriostats to comminuted meats in an amount sufficient to at least inhibit growth of commonly encountered pathogenic and nonpathogenic organisms in said meats;
   (b) admixing a given amount of at least one chemical acidulating material to such meats and relatively promptly forming sausages from such acidulated meats so that a pH of less than about 5.7 is attained within said sausages;
   (c) thermally treating the so-formed sausages at time-temperature conditions sufficient to attain an average internal temperature within each sausage of at least about 58° C. within about 5 to 12 hours after initiation of step (a); and
   (d) subjecting the thermally treated sausages to a controlled drying environment having a relatively high temperature and a relatively low relative humidity sufficient to remove about 28 grains of water per pound of air for a period of time sufficient to reduce the moisture level in each of said sausages to a maximum of approximately 35%.

2. A method of producing dry sausages as defined in claim 1 wherein said bactericides and bacteriostats are selected from the group consisting of potassium nitrite, sodium nitrite and mixtures thereof.

3. A method of producing dry sausages as defined in claim 2 wherein the amount of bactericides and bacteriostats added to said comminuted meats is in the range of about 100 to 150 ppm of meat.

4. A method of producing dry sausages as defined in claim 1 wherein said acidulating material is selected from the group consisting of glucono delta lactone, lactic acid, acetic acid, phosphoric acid, maleic acid, citric acid, fumaric acid, tartaric acid, adipic acid, succinic acid, hydrochloric acids, anhydrides of such acids, edible salts of such acids, and mixtures thereof.

5. A method of producing dry sausages as defined in claim 4, wherein said acidulating material is selected from the group consisting of glucono delta lactone, lactic acid, acetic acid, hydrochloric acid and mixtures thereof.

6. A method of producing dry sausages as defined in claim 1 wherein said thermal treating of sausages includes subjecting said sausages, after they attain an average internal temperature of at least about 58° C., to a relatively brief hot water shower to remove any exuded material on the outer surface of said sausages.

7. A method of producing dry sausages as defined in claim 1 wherein said drying environment has a temperature in the range of about 18° to 24° C. and has a relative humidity in the range of about 50% to 65% so as to attain an average moisture removal rate from said sausages of at least about 2% per 24 hours.

8. A method of producing dry sausages as defined in claim 1 wherein the amount of acidulating material admixed with the meats is sufficient to impart a pH to sausages formed therefrom in the range of about 5.7 to 5.0.

9. A method of producing dry sausages as defined in claim 1 wherein said process is relatively continuous and yields a dry sausage product within about 5 to 20 days capable of prolonged non-refrigerated safe storage.

10. A dry sausage produced in accordance with the method defined in claim 1 and characterized by (a) a pH of about 5.7 to 5.0; (b) a maximum moisture content of approximately 35%; (c) a salt content of at least about 5%; (d) a nitrite content of not more than about 50 ppm and (e) a water activity level of not more than about 0.86.

11. A dry sausage product as defined in claim 10 wherein said product is characterized by (a) a pH of about 5.7 to 5.4; (b) a moisture content of approximately 30%; (c) a salt content of at least about 5%; (d) a nitrite content of not more than about 50 ppm and (e) a water activity level of not more than about 0.86.

* * * * *